(12) United States Patent
Broatch

(10) Patent No.: US 7,299,591 B2
(45) Date of Patent: Nov. 27, 2007

(54) SOLAR THERMAL ROOFING

(76) Inventor: Peter Martin Broatch, The Cartshed, Church Lane, Osmington, Dorset (GB) DT3 6EW ( * ) Notice: Subject to any disclaimer, the term of this patent is extended or adjusted under 35 U.S.C. 154(b) by 0 days.

(21) Appl. No.: 10/398,410

(22) PCT Filed: Oct. 5, 2001

(86) PCT No.: PCT/GB01/04440

§ 371 (c)(1),
(2), (4) Date: Jul. 8, 2003

(87) PCT Pub. No.: WO02/31415

PCT Pub. Date: Apr. 18, 2002

(65) Prior Publication Data

US 2004/0098932 A1    May 27, 2004

(30) Foreign Application Priority Data

| Oct. 9, 2000 | (GB) | 0024662.9 |
| Jan. 15, 2001 | (GB) | 0101009.9 |
| Mar. 9, 2001 | (GB) | 0105839.5 |

(51) Int. Cl.
*E04D 13/18* (2006.01)

(52) U.S. Cl. ................. 52/173.3; 52/90.1; 52/553; 52/518

(58) Field of Classification Search ......... 52/173.3, 52/409, 518, 519, 553, 90.1; 136/244; 126/633
See application file for complete search history.

(56) References Cited

U.S. PATENT DOCUMENTS

| 4,083,360 A | | 4/1978 | Courvoisier | |
| 4,111,188 A | * | 9/1978 | Murphy, Jr. | 126/622 |
| 4,202,319 A | | 5/1980 | Vinz | |
| 4,286,582 A | * | 9/1981 | Nevins | 126/658 |
| 4,319,437 A | * | 3/1982 | Murphy | 52/220.1 |
| 4,364,374 A | * | 12/1982 | Brazzola | 126/677 |
| 4,378,789 A | * | 4/1983 | Vironneau | 126/654 |
| 6,079,170 A | * | 6/2000 | Slebos | 52/220.1 |
| 6,494,200 B1 | * | 12/2002 | Rylewski | 126/633 |

FOREIGN PATENT DOCUMENTS

| DE | 27 02 939 A | 7/1978 |
| DE | 30 26 217 A | 2/1982 |

(Continued)

*Primary Examiner*—Jeanette E. Chapman
*Assistant Examiner*—Basil Katcheves
(74) *Attorney, Agent, or Firm*—Nixon & Vanderhye P.C.

(57) ABSTRACT

An external building surface formed by at least one of a roof and a wall, the external building surface comprising a plurality of battens spaced apart to define a plurality of transverse courses, a plurality of tiles supported by the battens in the courses defined thereby to provide an outer layer of said external building surface, which tiles are transparent to solar radiation, a plurality of strips arranged one for each course to form an inner layer substantially coextensive with the outer layer, which strips are absorbent to solar radiation, and a duct for a fluid heat transfer medium of a solar heating system extending lengthwise of the strips so that in use the fluid medium is heated when the strips absorb solar radiation incident through the tiles, wherein in each course there is a space wherein air is held over and along the strip in that course.

22 Claims, 3 Drawing Sheets

FOREIGN PATENT DOCUMENTS

| | | |
|---|---|---|
| DE | 3218013 | 11/1983 |
| DE | 3934719 A | 4/1991 |
| DE | 197 03 467 A | 8/1998 |
| GB | 2070232 A | 9/1981 |
| JP | 57-150756 | 9/1982 |
| JP | 4-343963 | 11/1992 |

* cited by examiner

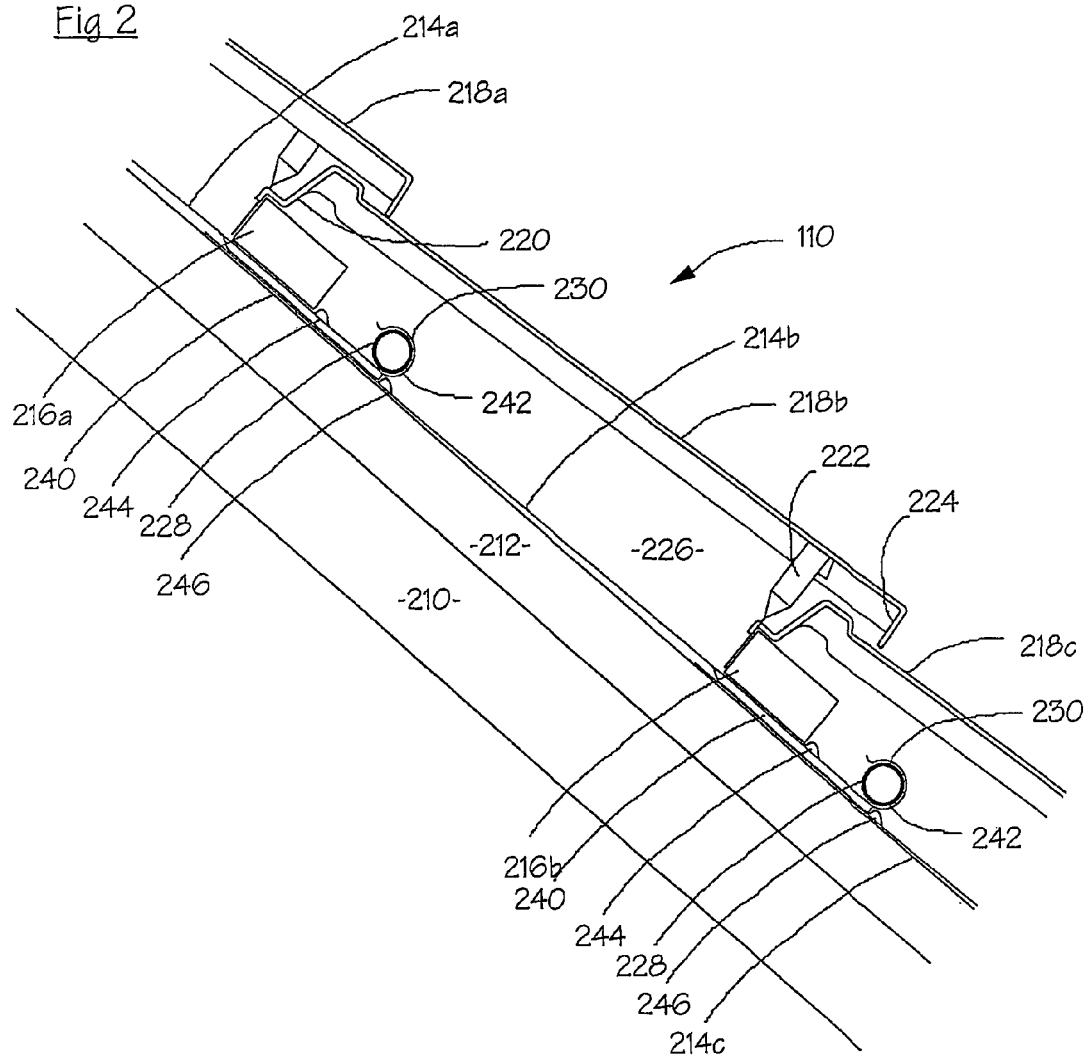

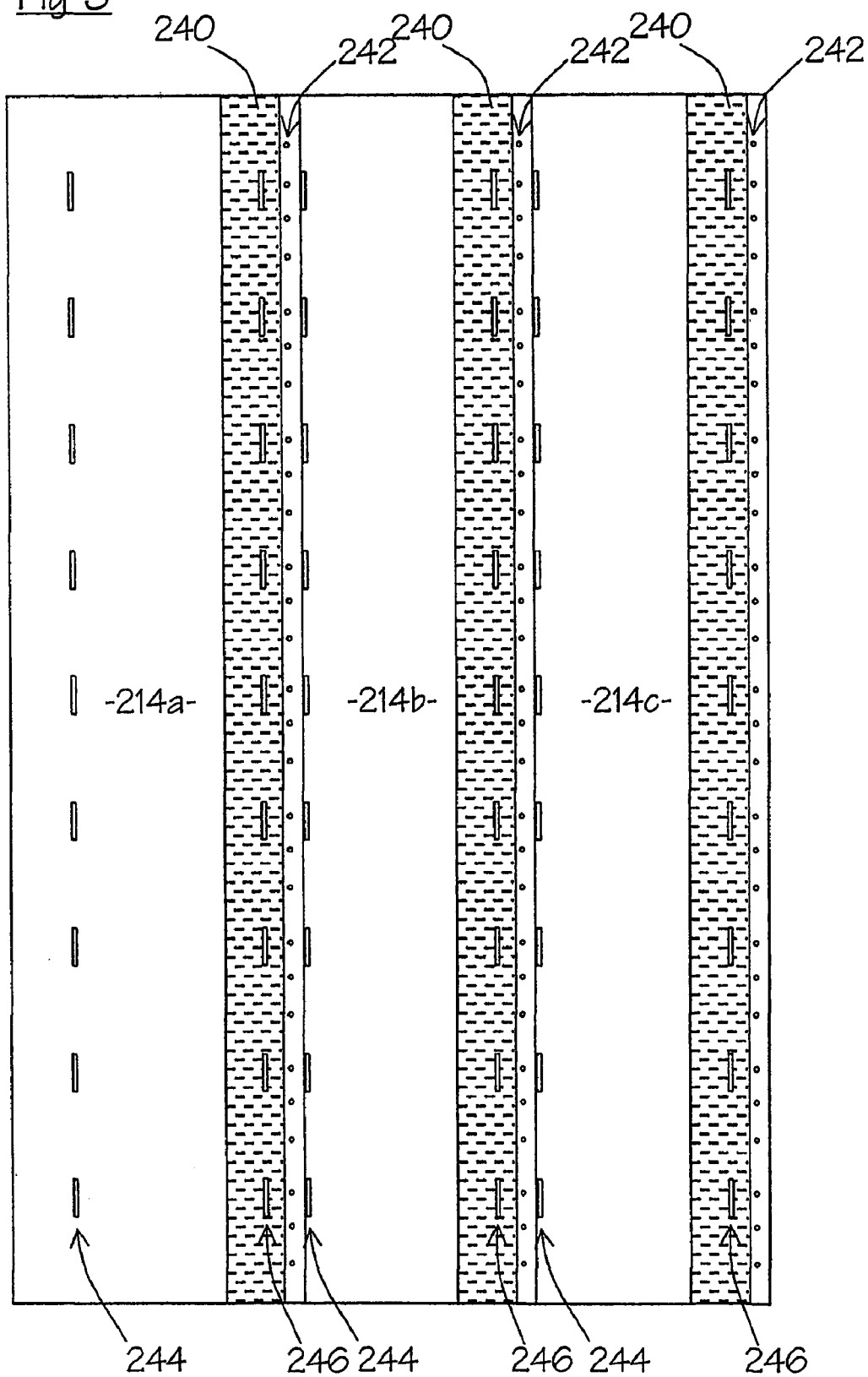

SOLAR THERMAL ROOFING

This application is the US national phase of international application PCT/GB01/04440 filed 5 Oct. 2001, which designated the US.

FIELD OF THE INVENTION

This invention concerns solar thermal roofing, which is to say roofing which collects heat from sunlight for space or water heating.

BACKGROUND OF THE INVENTION

It is well known that solar energy may be used to provide hot water, and this is common in tropical and sub-tropical countries. In higher latitudes the gain is less but still beneficial. In Britain, for instance, solar energy can provide domestic hot water for an average family through the summer months and a useful top-up (by pre-heating the water supply) through the rest of the year. Over the course of a year a south-facing roof in Britain receives about 1000 kWh/m$^2$, which is clearly an important potential source of energy.

Typically the solar energy is captured by means of a so-called flat plate collector which is often mounted upon a roof. The collector comprises a closed box with a transparent cover and, inside the box, an absorber plate coloured black or otherwise treated to absorb incident radiation. Water passed through pipes within the box is heated. The amount of energy captured depends upon the size of the collector, which is naturally limited by handling and aesthetic considerations, particularly when the collector is roof-mounted. Also, importantly, the effectiveness of the collector depends upon limiting heat loss, and as well as being thermally insulated the box is conventionally closed to prevent convective heat loss. Thus, in use, still air provides a blanketing effect so that heat builds up in the box.

It is previously known to cover a roof with photovoltaic tiles to generate electricity, but it will be appreciated that these are relatively easy to connect together. For a thermal system, however, conventional flat plate collectors, if reduced to the size of a typical roof tile, would entail unacceptable time and cost in interconnection. Accordingly various previous proposals have been made to adapt roofing tiles to deliver solar heating.

Offenlegungsschrift DE 3934719 discloses an arrangement in which aluminium tiles are shaped to hook over pipes of a solar heating system, which pipes thereby serve as tiling battens. The tiles are anodised and have a matt black outer face so as to absorb incident solar radiation and pass heat on to water circulating through the pipes. This system lacks any insulative covering for the tiles, which would thereby suffer considerable heat loss from convection, and even more so when subject to precipitation and afterwards due to evaporation.

Offenlegungsschrift DE 3218013 has a tiling batten which is itself is made of thermally conductive metal and embraces a pipe for a solar heating system. However it is proposed that conventional roofing tiles be hung from these battens, which restricts the solar gain because conventional tiles are not transparent to solar radiation. A further reduction of effectiveness stems from the fact that the battens cover only a comparatively small part of the roof area which could be used for collecting solar heat.

U.S. Pat. No. 4,202,319 discloses roofing tiles in the form of reduced-size flat plate collectors. Each of these tiles has an inlet and an outlet connected to channels in a batten, thus providing a circulatory route for fluid of a solar heating system. Those skilled in the science will appreciate that the need to ensure a fluid-tight connection between each tile and its supporting batten places great demands on both the accuracy of manufacture and the skill of the roofer. This implies high cost, which is raised further by coils or a similar heat collecting structure within each tile.

A much simpler approach is proposed in Japanese Patent No. 4 343 963 whereby heat exchange pipes are laid within grooves formed in fibreboard roofing sheets which are then covered with transparent tiles. However with the arrangement disclosed there is no provision for the desirable blanket of still air.

U.S. Pat. No. 4,364,374 discloses a tile-like panel with a plurality of spaces for air. However this air circulates (for the purpose of heat transfer) rather than acting as a blanket. Further, the panel is designed and arranged in such a way that connection to a solar heating system is provided by means of a pipe extending through one of the spaces which, when the panel is connected to others on a pitched roof, makes an open passage for air from the base to the summit of the roof. This necessarily entails substantial convective heat loss.

U.S. Pat. No. 4,083,360 discloses an arrangement in which one or more flat plate collectors are disposed between rafters of the roof, beneath an area of radiation-transmitting tiles. The tiles may be formed, in the manner of double glazing, to provide heat insulation, and it is stated that the collectors may extend throughout the slope of a roof.

United Kingdom Patent 2 070 232 discloses a roof structure for collecting thermal energy in which air passes through ventilation elements under tiles of the roof. The tiles are conventional, so they are not transmissive of solar radiation as in a normal collector, and the system provides for an air flow rather than a blanket of substantially still air.

SUMMARY OF THE INVENTION

It is an object of the present invention to provide solar thermal roofing (or walling, since the invention is equally applicable to vertical surfaces) which has the desirable heat insulation of flat plate collectors but without the additional cost and complication thereof.

Thus according to the present invention there is provided a roof or wall face comprising a plurality of battens spaced apart to define a plurality of transverse courses, a plurality of tiles supported by the battens in the courses defined thereby to provide an outer layer of said face, which tiles are transparent to solar radiation, a plurality of strips arranged one for each course to form an inner layer substantially coextensive with the outer layer, which strips are absorbent to solar radiation, and a duct for a fluid heat transfer medium of a solar heating system extending adjacent the strips so that in use the fluid medium is heated when the strips absorb solar radiation incident through the tiles, wherein in each course there is a space wherein air is held over and along the strip in that course.

Those skilled in the science will appreciate that the invention provides the benefits of effective solar heating (including a thermally insulative air blanket) without requiring a separate flat plate collector or other complications of the prior art. It will also be appreciated that these benefits may be extended over substantially all of the roof or wall face, potentially well beyond what is available from a conventional collector.

In each course the air may be held in said space by cooperation among the battens, the tiles and/or the strips.

The duct preferably extends through each said space. The strips may be provided with means, such as brackets or turned-up edges, to support the duct, and the duct may comprise a flexible pipe extending substantially continuously through all said spaces.

Rather than being a continuous length, it is preferred for convenience of laying the roof that each strip comprises transversely discrete sections. The battens may overlie the strips or the strips may overlie the battens.

The roof or wall face preferably includes ventilation means to ventilate each said space. The ventilation means may be formed in the strips, for instance by corrugating an edge whereby each strip is secured to a batten. The strips may also be formed and arranged to provide a run-off for moisture in said spaces.

The strips may be backed by a layer of thermally insulative material and the roof face may also include a semi-porous membrane backing the strips.

The roof or wall face is preferably disposed generally towards the Equator.

BRIEF DESCRIPTION OF THE DRAWING

Other features of the invention will be apparent from the following description, which is made by way of example only and with reference to the accompanying schematic drawings in which

FIG. 2 is a schematic view in side elevation of part of a roof face of the house of FIG. 1, which roof face embodies the invention;

FIG. 3 is a schematic plan view from above of strips comprising a first layer of the roof face of FIG. 1.

DETAILED DESCRIPTION OF THE INVENTION

Figure 1:
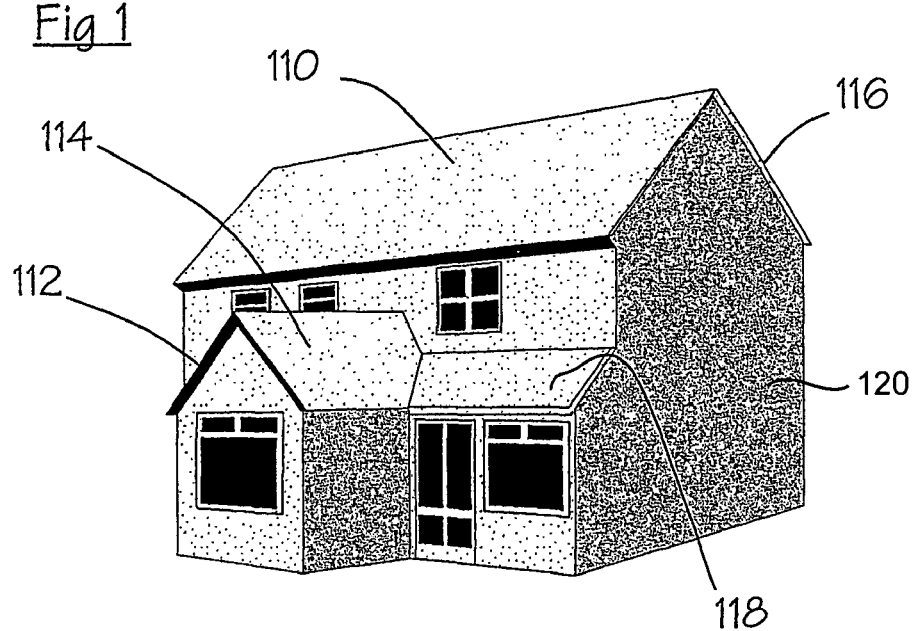
FIG. 1 is a perspective view of a house.

Referring first to FIG. 1, the house shown therein has a roof face 110. As will be described in more detail hereinafter, the roof face 110 is arranged as a solar thermal collector. The roof face 110 is chosen for this purpose because it is disposed generally towards the Equator (in contrast to the roof faces 112, 114 and 116) and because it is large (in comparison with the porch roof face 118).

It may be noted that if the disposition of the house of FIG. 1 were (as viewed from above) turned through 90° clockwise, the roof face 114 would then face the Equator and could be used as a solar collector instead of the face 110. However, in this disposition it would be better to use the wall face 120 because of its greater size. (The invention is applicable to wall faces as well as to roof faces).

Referring now to FIG. 2, this shows that the roof face 110 comprises a thermally insulative layer 210 and a plurality of counter battens 212 secured over the layer 210. The counter battens 212 extend up and down the roof and are evenly spaced apart to support a plurality of aluminium strips 214a, 214b, 214c etc extending across the roof and mutually overlapping at their edges to formed a substantially continuous inner layer. Battens 216a, 216b etc are secured to the roof structure on top of the overlapping edges of the aluminium strips 214a, 214b, 214c etc which have a matt black coating and will be described in more detail hereinafter with reference to FIG. 3. The battens 216a, 216b etc thus hold the strips 214a, 214b, 214c etc in place and they also support an outer layer of tiles 218a, 218b, 218c etc each made of polycarbonate and transparent to solar radiation.

Considering the tile 218b, this has a tail (lower end) which extends over the head (upper end) of the downwardly adjacent tile 218c to provide a runoff for precipitation. Similarly the head of the tile 218b fits under the tail of the upwardly adjacent tile 218a. There are also weather laps (not shown, but of common form) whereby the tiles overlap one another from side to side. Thus the tiles are imbricated together so that the outer layer is substantially continuous. The head of the tile 218b is formed with a flange 220 extending down to engage the batten 216a whereby the tile 218b is secured at its head. The tail of the tile 218b is held by a roofing clip 222 of common form gripping a weather lap of the tile 218b in well known manner. The tail of the tile 218b is also formed with a lip 224 for engaging the downwardly adjacent tile 218c.

All the tiles of the roof are similar and similarly laid save where special arrangements are needed at the base and summit and the sides of the roof. As those skilled in the science will appreciate, at the base of the roof the tails of the lowest course of tiles overlay a fascia board, at the summit the highest course of tiles is capped with a ridge tile, and the end tiles in each course are mortared or bonded in place, with a shaped filling piece if required.

As can be seen clearly from FIG. 2, there are spaces 226 between the inner and outer layers of the roof, bounded by the tiles and the metal strips. A copper pipe 228 for water (or another fluid heat transfer medium) of a solar heating system extends through the each space 226. The pipe 228 is releasably clipped in the downward edge of the aluminium strip 214a, which is turned up at 230 to wrap around the pipe 228 in a thermally conductive connection therewith.

In use, when the sun shines on the roof face 110 of FIG. 1, solar radiation passes through the transparent tiles 218a, 218b, 218c etc and falls on the aluminium strips 214a, 214b, 214c etc, which are highly absorbent to the incident radiation and thereby are strongly heated. The heat from the strip 214a is passed by thermal conduction through the copper pipe 228 and thence into the water it contains, to be used for space heating or as hot water. The pipe 228 is laid sinuously across the roof (being formed to be flexible or having curved connectors at its ends) so that it passes repeatedly through the each space 226 between the first and second layers of the roof. In this way the temperature of the water is raised further.

It should also be noted that each space 226 is effectively enclosed. The flange 220 at the head of the tile 218b cooperates with the batten 216a to prevent any substantial upward convection of air from the space 226 and there is a similar arrangement at the tail of the tile 218b. Thus air is held in the space 226 to provide a blanket against heat loss.

The space between the inner and outer layers of the roof face 110 may be ventilated to avoid the deleterious effects of dampness, especially as may arise from condensation, and means for this will now be described with reference to FIG. 3.

As can be seen in the plan view of FIG. 3, each of the aluminium strips 214a, 214b and 214c (and other similar strips covering the roof) is made up of transversely discrete segments each some 2000 mm long by 500 mm wide. Each segment is longer than the width of the tiles, in the transverse direction. The strips all mutually overlap along their long edges, which extend transversely across the roof, and the width of the non-overlapped portion of each segment is no greater than the depth of the tiles in the up-down direction.

Along the length of each overlap the edge of the overlying strip is turned up to hold a pipe, as at 230 (FIG. 2). Adjacent this edge each strip is formed with a corrugated section 240 providing channels running widthwise of the strip (ie down the slope of the pitch roof). These channels ventilate the space between the aluminium strips and the tiles which overlie them.

The channels also provide a means whereby any moisture, eg from condensation, may drain down through this space. To continue this drainage means downwards the turned up edges of the aluminium strips are perforated as indicated at 242.

Finally with regard to drainage, any condensation on the underside of the tile 218b will run down and drain out of the space by way of the lip 224, which does not have sealing engagement with the downwardly adjacent tile 218c or may be formed specifically to provide a drainage passage. This applies to each tile of the roof, of course.

As can also be seen in both FIGS. 2 and 3, the aluminium strips 214a, 214b, 214c etc are each formed with rows of upstanding nubs 244 and 246 whereby the strips are mutually arranged during laying and the battens 216a, 216b etc positioned.

It will now be understood that the invention enables substantially all of the roof face 110 to serve as a solar collector with the benefits of effective insulation and ventilation.

Figure 4:
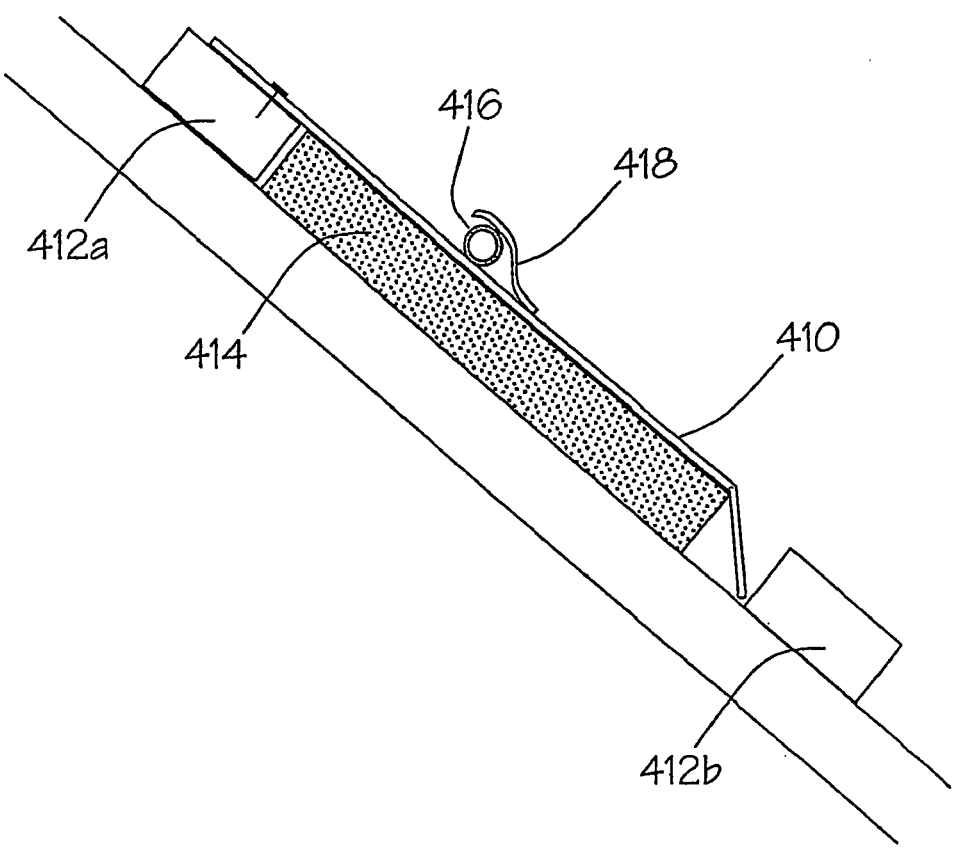
FIG. 4 is a schematic side elevation showing another embodiment of the invention.

FIG. 4 shows a second embodiment of a pitched roof according to the invention, omitting the ties thereof for simplicity of illustration. This embodiment has two notable modifications compared with that of FIG. 2. First, each metal absorbent strip 410 is laid on top of a corresponding batten 412a, rather than below it. (With an insulative layer 414 between the battens 412a and 412b as shown, the strip 410 may thus be substantially flat). Second, the pipe 416 for the solar heating system is held in brackets 418 secured to each strip 410. (A thermally conductive paste may be placed between the pipe and the brackets to improve heat transfer).

Various modifications may be made to the invention as described. For instance the aluminium strips may be replaced by strips of black synthetic plastics material absorbent to solar radiation, which reduces the cost and may simplify laying but may have a performance penalty from the absence of conductive coupling to the pipe for the heat transfer fluid. The strips (whether of metal or plastics) may be formed to embody the duct. The tiles may be made of glass or some material other than polycarbonate and may be coloured or otherwise treated to modify the appearance of the roof (provided, of course, that the tiling layer remains transparent to solar energy). The tiling layer may also be made to block any outward loss of heat, for instance by being formed with an inwardly reflective coating. The tiles may be formed, eg with fresnel prisms, to focus incident solar radiation on the pipe for the heating water. The battens may be made of wood, as is conventional, or of any other suitable material. The battens may also embody the duct. Finally it will be understood that systems using the invention may be used for cooling as well as heating, by running the system at night.

The invention claimed is:

1. An external building surface being at least one of a roof and a wall, the external building surface comprising:
    a plurality of battens spaced apart to define a plurality of transverse courses,
    a plurality of tiles supported by the battens in the courses defined thereby to provide an outer layer of said external building surface, which tiles are transparent to solar radiation,
    a plurality of strips arranged one for each course to form an inner layer substantially coextensive with the outer layer, which strips are absorbent to solar radiation, and
    a substantially continuous flexible duct for a fluid heat transfer medium of a solar heating system laid sinuously across said building surface extending lengthwise of the strips and thermally connected to said strips, so that in use the fluid medium is heated when the strips absorb solar radiation incident through the tiles,
    wherein in each course there is a space wherein air is held over and along the strip in that course.

2. The external building surface as claimed in claim 1, wherein in each course air is held in each space by cooperation among the battens, the tiles and/or the strips.

3. The external building surface as claimed in claim 1 wherein said outer layer extends over substantially all of said external building surface.

4. The external building surface as claimed in claim 1 wherein the duct extends through each said space.

5. The external building surface as claimed in claim 1 including means on the strips to support the duct.

6. The external building surface as claimed in claim 5 including brackets secured to the strips to support the duct.

7. The external building surface as claimed in claim 5 wherein edges of the strips are turned up to support the duct.

8. The external building surface as claimed in claim 1 wherein the duct comprises a flexible pipe extending substantially continuously through all said spaces.

9. The external building surface as claimed in claim 1 wherein the strips are formed to embody the duct.

10. The external building surface as claimed in claim 1 wherein the strips each comprise transversely discrete sections.

11. The external building surface as claimed in claim 10 wherein, in each course, each section is of greater overall dimension than each tile in the transverse direction.

12. The external building surface as claimed in claim 1 wherein the strips mutually overlap along transverse edges to define overlapped and non-overlapped portions and, in each course, the width of the non-overlapped portion is of no greater overall dimension than each tile in a direction orthogonal to the transverse across said external building surface.

13. The external building surface as claimed in claim 1 wherein the battens overlie the strips.

14. The external building surface as claimed in claim 1 wherein the strips overlie the battens.

15. The external building surface as claimed in claim 1 including ventilation means to ventilate each said space.

16. The external building surface as claimed in claim 15 wherein said strips are formed with said ventilation means.

17. The external building surface as claimed in claim 16 wherein each strip has an edge whereby it is secured to a batten, which edge is corrugated to provide said ventilation means.

18. The external building surface as claimed in claim 1 wherein the strips are formed and arranged to provide a run-off for moisture in said spaces.

19. The external building surface as claimed in claim 1 including a layer of thermally insulative material backing the strips.

20. The external building surface as claimed in claim 1 including a semi-porous membrane backing the strips.

21. The external building surface as claimed in claim 1, in which said external building surface is disposed generally towards the Equator.

22. The external building surface as claimed in claim 1, wherein said external building surface comprises a roof.

* * * * *